TRANSDUCING SYSTEM

Filed May 16, 1962 2 Sheets-Sheet 1

INVENTOR:
David Paul Gregg
By Smyth, Roston & Pavitt
Attorneys

INVENTOR.
David Paul Gregg
By Smyth, Roston & Pavitt
Attorneys 3,391,255
Patented July 2, 1968

3,391,255

TRANSDUCING SYSTEM

David Paul Gregg, Los Angeles, Calif., assignor to Minnesota Mining and Manufacturing Company, St. Paul, Minn., a corporation of Delaware Filed May 16, 1962, Ser. No. 195,218
18 Claims. (Cl. 179—100.3)

Figure 1:
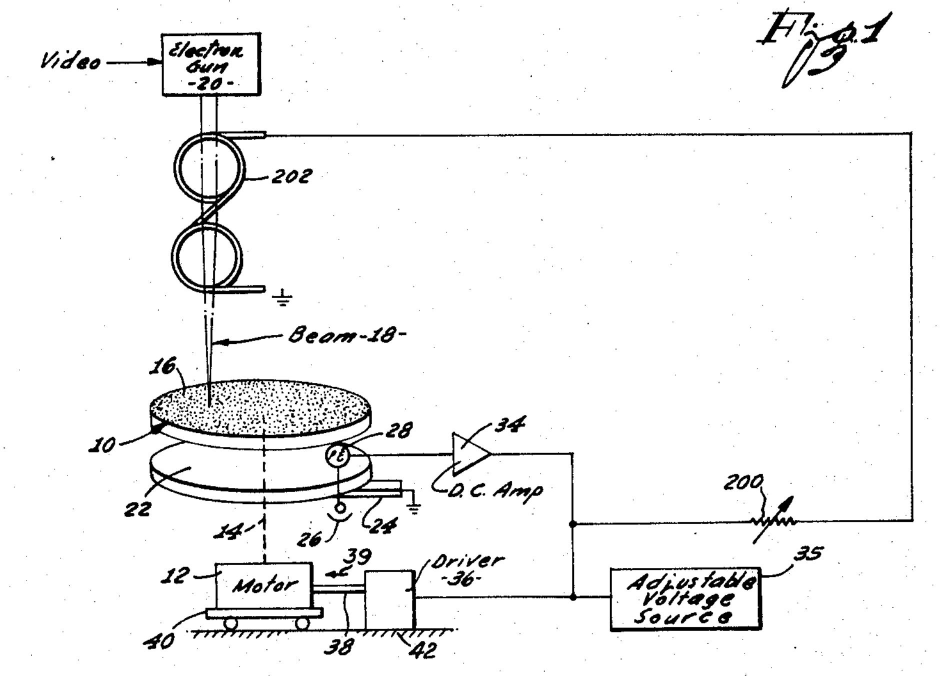

This invention relates to a system for recording information such as video and audio information on a storage medium such as a disc.

In recent years systems have been devised which record high frequency information on a storage medium and provide a subsequent reproduction of the information from the storage medium. For example, signals representing an image being viewed and the sound emanating from the environment of the image have been recorded on a magnetic tape. Also, signals have been recorded on storage media to represent different scientific and mathematical information including the readings of instruments and the values obtained from computations performed by digital computers.

For the recording of high frequency information the systems now in use generally employ magnetic tapes as the storage medium. These tapes have proved fairly successful in recording signals representative of information and in obtaining the reproduction of the information. However, the magnetic structure of the tape limits the fidelity of the recording and reproduction so that the magnetic tapes have to be manufactured with considerable precision. The information recorded on the magnetic tapes also has a limited density of information so that a relatively great amount of tape is required to store information such as that required for a television program having a duration of one-half an hour or an hour. The limited density of information packing on the tape has resulted from limitations in the speed of response of the magnetic transducer heads which are disposed in contiguous relationship to the tape.

In the systems now in use, the transducing head is generally disposed adjacent to the tape to record information in magnetic form on the tape and to reproduce the magnetic information as electrical signals from the tape. The adjacent relationship between the transducing head and the tape occasionally causes the tape to rub against the head so that magnetic particles become removed from the tape and are deposited on the head to affect the operation of the head. The magnetic particles on the tape tend to produce an abrasive action on the head, thereby permanently affecting the response characteristics of the head.

It is also difficult to use a magnetic tape as a master for the reproduction of a large quantity of identical tapes because of the wear on the tape and the adjacent heads and because of the considerable length of tape required for the master. It would, therefore, be more desirable to use discs as the master since they tend to store information in a more compact form than tapes. However, the discs systems of the prior art have generally involved a groove cut in a disc of plastic material with variation in the walls of the groove representing the electrical information.

The disc systems of the prior art have had certain important deficiencies. For example, the reproducing means has generally been in contiguous relationship with the disc. Actually, the reproducing means has constituted a needle which has contacted a groove in the disc to reproduce the information on the disc. This contact between the needle and the groove has tended to wear the disc after the disc has been used several times.

This invention provides a system which uses a disc as the storage medium and which is responsive to incoming information so as to vary the light transmission characteristics of the disc in accordance with such information and to obtain a recording of the information on the disc. For example, the light transmission characteristics of the disc are varied in a spiral track during the recording operation by an electron beam whose characteristics are controlled by signals representative of the incoming information. By way of illustration, the intensity of the electron beam may be varied by adjusting the potential on the grid of an electron gun in accordance with the characteristics of the information to be recorded. Since the electron beam is projected toward the disc from a position removed from the disc, no frictional forces are produced on the disc by the transducing action.

This invention provides means for recording information on the disc in a spiral track having a constant pitch. A driving means is provided to move the disc along a radial line extending from the center of rotation of the disc. As the disc is moved along the radial line, the disc is also rotated at a constant speed past an electron beam which is maintained at a substantially constant position. The combination of the movement and rotation of the disc past the stationary electron beam produces a spiral track on the disc.

The driving means is regulated by a control signal developed by a system including a first annular member rotating at the same speed as the disc and having a spiral line located on the annular member. A segment of an annular member is disposed adjacent and relatively stationary to the first annular member and has a series of lines located on its surface. Means are provided to detect differences in position of the spiral line on the first annular member and the lines on the segment when the first annular member is rotated. A signal is then developed in accordance with the difference in position. This signal is applied to the driving means to move the disc along the radial line extending from the center of rotation of the disc.

The driving means also includes a coarse control of the radial movement of the disc relative to the beam so that the information becomes recorded on the beam at a substantially constant rate. A fine control is also provided which corrects for instantaneous variations in the radial movement of the disc. This is accomplished by deflecting the electron beam in accordance with instantaneous changes in the speed at which the disc is moved radially.

Reproduction of the signals from the disc is accomplished by directing a light beam at the disc and by modifying the light beam in accordance with the light transmission characteristics previously provided at successive positions on the spiral track on the disc. The modified light beam is detected to obtain a recovery of the information previously recorded on the disc. The information on the disc can be reproduced without having any members directly engage the disc. In this way, no wear is produced on the disc during the reproduction of the information on the disc. The reproducing system has been disclosed and claimed in copending application Ser. No. 181,392 filed on Mar. 21, 1962, by Wayne R. Johnson and assigned of record to the assignee of this application and is not considered to be part of this invention.

Figure 2:
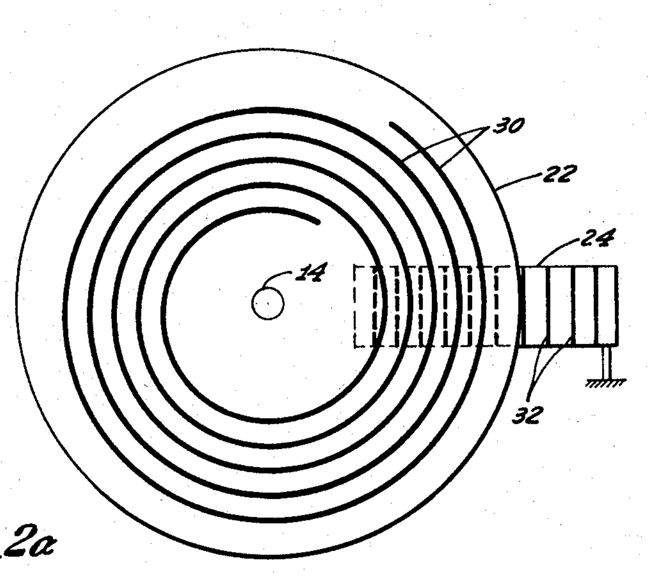
Figure 2A:
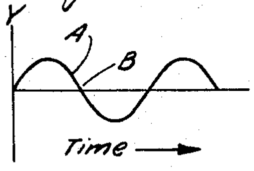
Figure 3:
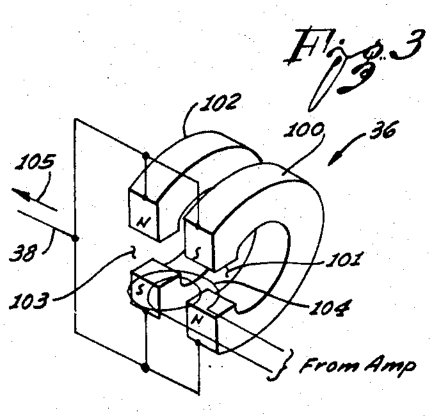
Figure 3A:
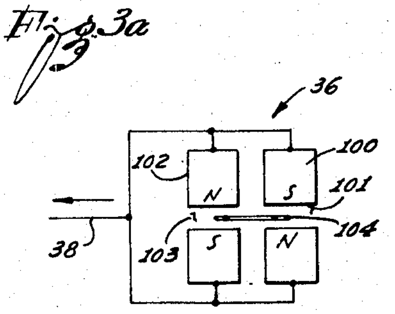
Figure 4:
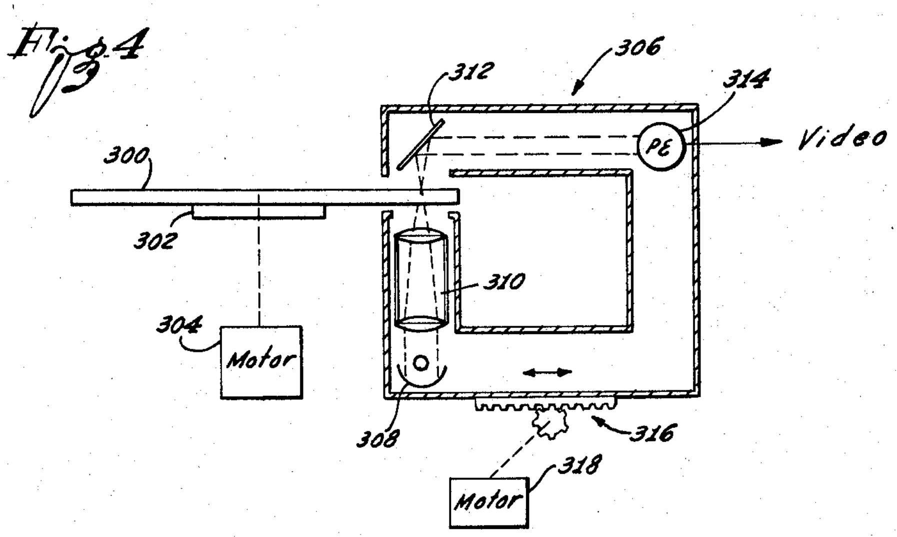

In the drawings:

FIGURE 1 somewhat schematically illustrates a system for moving a disc radially and for rotating the disc past recording means to obtain a recording of information in a spiral track on the disc and also illustrates a coarse and fine control for the movement. The mechanical details of the system are shown in side elevation and the electrical stages are shown in block form;

FIGURE 2 is an enlarged top plan view of certain components included in the system shown in FIGURE 1 for producing a driving signal to obtain the movements of the disc along a radial line;

FIGURE 2*a* is a curve of the driving signal which would be produced during the rotation of the disc if the disc were not moved along the radial line;

FIGURE 3 is a somewhat schematic perspective view of one embodiment of a driver which may be included in the system shown in FIGURE 1 to drive the disc in the radial direction;

FIGURE 3*a* is a side elevational view of the driver illustrated in FIGURE 3; and FIGURE 4 is a somewhat schematic side elevational view of a system (not forming a part of this invention) for reproducing information previously recorded on the disc.

In the recording system of FIGURE 1, a disc 10 is driven by a motor 12 to rotate at a substantially constant speed. The motor 12 is coupled to the disc 10 through a shaft 14. The disc 10 may be made of glass or quartz or any other suitable material. The disc 10 has on its surface a photographic coating 16 which is responsive to charged particles directed at the coating 16 in the form of a beam 18. This beam 18 of charged particles is obtained from an electron gun generally indicated at 20. The intensity of the beam 18 of charged particles may be controlled by adjusting the potential on the grid (not shown) of the electron gun 20 in accordance with the characteristics of the information to be recorded. This may be accomplished for television by the application of video signals to the electron gun 20. The construction of the electron gun is described in full detail in copending application Ser. No. 181,393 filed on Mar. 21, 1962, by David Paul Gregg and assigned of record to the assignee of record in this application.

Also mounted on the shaft 14 is an additional disc 22 which rotates at the same speed as the disc 10. Adjacent to the disc 22 is a segment 24 of a disc which is maintained stationary with respect to the disc 22. A stationary source 26 directs light through the segment 24 and the disc 22 to a photoelectric cell 28. The segment 24 operates as a reference member and controls the output signal from the photocell 28 to be in accordance with the relative positions of the segment 24 and the disc 10.

On the surface of the disc 22 is a spiral 30 (FIGURE 2) which is opaque to light energy. The segment contains a series of lines 32 which have the same pitch as the pitch of the spiral 30. The lines 32 are also opaque to light energy. It will be appreciated that the lines 32 may also be curved to form a discontinuous spiral similar to the spiral 30. The radial length of one of the members 22 or 24 is approximately twice as great as the radial length of the other member. Preferably the radial length of the segment 24 is twice as great as the radial length of the disc 22.

As the disc 22 rotates, the light passing through the segment 24 and the disc 22 is modulated in each cycle of rotation in accordance with relative changes in the instantaneous disposition of the spiral 30 on the disc 22 and the lines 32 on the segment 24. If the lines 32 are straight, the source of light 26 is focused along the center of the segment 24. If the lines 32 are part of a discontinuous spiral, the source of light may be focused over a broader area. The photocell 28 detects the modulated light energy and produces a signal which is applied to an amplifier 34. An adjustable voltage source 35 is also coupled at the output of the amplifier 34. The combination of the signals from the amplifier 34 and the voltage source 35 control the operation of a driver 36 which is responsive to a direct signal. The voltage source 35 provides energy for operating the driver 36. A shaft 38 is attached at one end to the driver 36 and at the other end to a base 40 which is illustrated schematically in FIGURE 1 as being rollable along a support surface 42 in a direction indicated by an arrow 39. The motor 12 is positioned permanently on the base 40 to follow the movement of the base 40. Because of this, the entire mechanism consisting of the motor 12, the shaft 14 and the disc 10 moves in accordance with the movement of the base 40.

FIGURE 2*a* shows the characteristics of the output signal which would be produced by the amplifier 34 at progressive instants of time if the base 40 were not moved in the direction indicated by the arrow 39. Actually, however, a direct voltage is produced by the amplifier 34 because of the movement of the base 40 by the driver 36 in the direction indicated by the arrow 39. If the driving system had an instantaneous response, the average value of the direct signal from the amplifier 34 would be substantially zero. However, since there is a time lag in the circuitry and the associated mechanical components, and since there is an inherent amount of friction in the mechanical components, the signal from the amplifier 34 stabilizes at a point A shown on the curve illustrated in FIGURE 2*a*. The voltage source 35 is then adjusted to compensate for the losses in the system and to therefore have the system stabilize at a zero point B shown on the curve illustrated in FIGURE 2*a*. The system tracks on a linear portion of the curve surrounding the point B illustrated in FIGURE 2*a* to compensate for errors in rotational and radial movement of the disc 10.

The characteristics of the signal seen in FIGURE 2*a* are actually hypothetical and represent a waveform which would be produced if the base 40 were not moved progressively in a radial direction. Under such circumstances, there would be a progressive increase in the error signal during a partial revolution of the disc 22, this progressive error resulting from progressive increases in the radial distance between the spial 30 on the disc and the position of one of the lines 32 on the segment 24. With a further rotation of the disc 10, the distance between the spiral 30 and the position of one of the lines 32 would decrease toward a value of zero and would then increase in the opposite direction. In the last portion of the revolution of the disc 10, the error signal would again become reduced toward a value of zero. In this way, the alternating signal shown in FIGURE 2*a* would be produced.

Actually, the alternating signal shown in FIGURE 2*a* is not produced during the operation of the system shown in FIGURE 1 since the base 40 is moved in a radial direction. The alternating signal is especially reduced to a value of 0 when the servo system shown in FIGURE 1 operates properly to insure that the pattern of recording on the disc 10 is spiral. If there were no friction in the mechanical portion of the system shown in FIGURE 1 and no time lag in the operation of both the electrical and mechanical portions of the system shown in FIGURE 1, the amplifier 34 in the servo system shown in FIGURE 1 could be adjusted to operate at a point A having a value of zero in the alternating signal shown in FIGURE 1. However, in view of mechanical frictions and time lags in the system shown in FIGURE 1, the amplifier 34 is chosen to operate at a point B which has a value different from 0. The point B in effect provides a positive force to overcome the effects of time lag and mechanical friction in the system shown in FIGURE 1.

The driver 36 can be of a type shown in FIGURE 3 or any other suitable type. In the embodiment shown in FIGURE 3, two circular-shaped magnets 100 and 102 are disposed adjacent to each other with the north pole of magnet 100 adjacent to the south pole of magnet 102 and the south pole of magnet 100 adjacent to the north pole of magnet 102. The magnets 100 and 102 are respectively provided with gaps 101 and 103. A flat coil of wire 104 is within the gaps formed between the north and south poles of the magnets 100 and 102. The coil 104 is disposed in a plane substantially perpendicular to the plane defined by each of the magnets 100 and 102. As a signal is applied to the coil 104 from the amplifier 34, the interaction between the magnetic field produced in one direction by the current passing through the coil 104 and the magnetic fields produced in a substantially perpendicular direction by the magnets 100 and 102 provides a motion of the magnets relative to the coil 104. As indicated by an arrow 105 in FIGURE 3, this motion of the magnets is in a direction corresponding to the plane defined by the coil 104 and perpendicular to the planes defined by the magnets 100 and 102. Although the magnets 100 and 102 have opposite polarities, the motion imparted to the magnet 100 by the coil 104 is in the same direction as the motion imparted to the magnet 102 by the coil since the current flowing through the coil 104 in the gap 101 is opposite in direction to the current flowing through the coil in the gap 103. The motion of the magnets is imparted to the base 40 through the shaft 38. It will be appreciated that the driver may also be constructed to have the magnets stationary with the motion imparted to the shaft 38 by a movement of the coil 104.

Since the electron gun 20 is fixed in position, the beam 18 produced by the electron gun 20 strikes the disc 10 at a substantially constant position. This may be at a point along the same radial line at which the disc 10 moves. The intensity of the beam at each instant is dependent upon the characteristics of the signal information introduced to the electron gun 20 at that instant, this signal information illustratively representing video and audio information or the readings of instruments or mathematical calculations. As the disc 10 rotates and moves along the radial line a spiral track of information is accordingly produced in photographic form on the coating 16 of the disc 10.

The driving system shown in FIGURE 1 also includes means for regulating the relative radial motion between the beam 18 and the disc 10 so that the information is recorded on the disc 10 in a spiral track having a constant pitch. A coarse control is obtained by the signal applied to the driver 36. Variations in the motion of the disc are detected by variations in the output signal from the photocell 28. This control, however, is not instantaneous due to the inherent time lag and friction in the mechanical components.

Means are therefore provided to control the relative motion of the beam and disc on an instantaneous or fine basis. The signal from the amplifier 34 is applied to an attenuator 200. The attenuator 200 is initially adjusted to provide a proper positioning of the beam and to compensate for any fixed errors in the system. The signal is then applied to coils 202 which are disposed to produce deviations in the electron beam from the gun 20 in a direction corresponding to the radial direction of the disc 10. The signal supplied from the amplifier 34 to the coils 202 provides indication of any deviation in the movement of the base 40 in the radial direction of the disc 10. By causing the coils 202 to shift the beam on an instantaneous basis in the radial direction, any deviation in the movement of the base 40 at a constant rate is compensated so that the beam is recorded on the disc 10 in a spiral path having a substantially constant pitch.

FIGURE 4 shows a schematic representation of a system for reproducing information on the disc. This system is disclosed in full detail and is claimed in copending application Ser. No. 181,392 filed by Wayne R. Johnson on Mar. 21, 1962, for a Disc Tracking System and assigned of record to the assignee of record in this application. Either the disc 10 can be used directly or a transfer of the information on the disc 10 may be made to a relatively thin disc 300 shown in FIGURE 4. The disc 300 rests on a turntable 302 and is rotated by a motor 304 at a constant speed. An arm 306 is shown to contain the various means for reproducing the information on the disc 300.

A source 308 directs a beam of light through a lens system 310 which focuses the light at the surface of the disc 300. The light passing through the disc 300 is modulated in accordance with the variable characteristics on the surface of the disc 300. A mirror 312 directs the modulated light energy to a photocell 314 which produces an electrical output in accordance with the modulations of the light energy. The signal then passes as a video signal to the normal television reproduction equipment.

The arm 306 is moved by a rack and pinion arrangement 316 along a radial line extending from the center of rotation of the disc 300. A motor 318 drives the rack and pinion 316. It will be appreciated that other means may be used to drive the arm such as a lead screw arrangement or a driving arrangement as shown in FIGURES 1 through 3. As described in detail in copending application Ser. No. 181,392, now abandoned, means may also be included for insuring that the information becomes reproduced from the disc at the same rate and with the same accuracy as the information is recorded on the disc.

It will be apparent to those skilled in the art that other modifications and adaptations may be made of the apparatus shown in the specification and the invention is, therefore, to be limited only by the appended claims.

What is claimed is:

1. In combination in a system for recording visual information on a medium in a spiral track on the medium to produce variable characteristics representing the information in the spiral track on the medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the second means along a line having a radial component extending from the center of rotation of the medium to produce a spiral track of information on the medium and fifth means responsive to variations in the movement of the medium relative to the second means along the line having the radial component for compensating for such variations in the movement of the medium relative to the second means.

2. In combination in a system for recording visual information on a medium in a spiral track on the medium for producing variable characteristics in the spiral track on a medium representing the information wherein the variable characteristics are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy in a direction having a radial component extending from the center of rotation of the medium, and fifth means operatively coupled to the fourth means and responsive to variations in the movement of the medium in the direction having the radial component for varying the disposition of the beam relative to the medium in the direction having the radial component to compensate for the variations in the rotary movement of the medium.

3. In combination in a system for recording visual information on a medium in a spiral track on the medium for producing variable characteristics in the spiral track on the medium representing the information wherein the variable characteristics are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy in a direction having a radial component extending from the center of rotation of the medium, fifth means operatively coupled to the first means and responsive to variations in the movement of the medium in the direction having the radial component for producing a control signal having characteristics representing such variations in the rotary movement, and sixth means operatively coupled to the fifth means and responsive to the control signal for varying the disposition of the beam relative to the medium in the direction having the radial component to compensate for the variations in the rotary movement of the medium.

4. In combination in a system for recording visual information on a medium in a spiral track on the medium for producing variable characteristics in the spiral track on the medium representing the information wherein the variable characteristicss are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy in a direction having a radial component extending from thec enter of rotation of the medium, fifth means operatively coupled to the first means and responsive to variations in the movement of the medium in the direction having the radial component for producing a control signal having characteristics representing such variations in such movement, and sixth means operatively coupled to the fifth means and responsive to the control signal for varying the movement of the medium relative to the beam in the direction having the radial component to compensate for the variations in the rotary movement of the medium.

5. In combination in a system for recording visual information on a medium in a spiral track on the medium for producing variable characteristics in the spiral track on the medium representing the information wherein the variable characteristics are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy in a direction having a radial component extending from the center of rotation of the medium, fifth means operatively coupled to the first means and responsive to variations in the movement of the medium in the direction having the radial component for producing a control signal having characteristics representing such variations in the rotary movement, sixth means operatively coupled to the fifth means and responsive to the control signal for varying the movement of the medium relative to the beam in the direction having the radial component to operate as a coarse control for compensating for the variations in the movement of the medium, and seventh means operatively coupled to the fifth means and responsive to the control signal for varying the disposition of the beam relative to the medium in the direction having the radial component to provide a fine control for compensating for the variations in movement of the medium.

6. In combination in a system for recording visual information on a medium in a spiral track on the medium to produce variable characteristics representing the information in the spiral track on the medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy in a direction having a radial component extending from the center of rotation of the medium to produce a spiral track of information on the medium, fifth means disposed relative to the first means and responsive to variations in the movement of the medium in the direction having the radial component for producing a control signal having characteristics representing such variations in the movement, and sixth means operatively coupled to the second means and responsive to the control signal for varying the disposition of the beam in the direction having the radial component to compensate for variations in the movement of the medium along the line having the radial component.

7. The combination set forth in claim 6 wherein the sixth means provides a fine control over the recording of the information in the spiral path on the medium and wherein seventh means are included for controlling the operation of the fourth means in accordance with the characteristics of the control signal to provide a coarse control over the recording of the information in the spiral track on the medium.

8. In combination in a system for recording visual information on a medium in a spiral track on the medium to produce variable characteristics representing the information in the spiral track on the medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy along a line having a radial component extending from the center of rotation of the medium to produce a spiral track of information on the medium, fifth means disposed relative to the first means and responsive to variations in the movement of the medium along the line having the radial component for producing a control signal having characteristics representing such variations in the movement, and sixth means operatively coupled to the fourth means and responsive to the control signal for controlling the operation of the fourth means in accordance with the characteristics of the control signal to regulate the movement of the medium relative to the beam along the line having the radial component.

9. In combination in a system for recording visual information on a medium in a spiral track on the medium to produce variable characteristics representing the information in the spiral track on a rotating annular medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy along a line having a radial component extending from the center of rotation of the medium to produce a spiral track of information on the medium, fifth means responsive to variations in the movement of the medium along the line having the radial component for producing a control signal having characteristics representing such variations in the movement, and sixth means operatively coupled to the second means and responsive to the control signal for varying the disposition of the beam relative to the medium along the line having the radial component to produce a control of the movement of the medium along the line having the radial component.

10. The combination set forth in claim 9 wherein the sixth means provide a fine control over the recording of the information in the spiral track on the medium and wherein seventh means are provided for controlling the operation of the fourth means in accordance with the characteristics of the control signal to provide a coarse control over the recording of the information in the spiral track on the medium.

11. In combination in a system for recording visual information on a medium in a spiral track on the medium for producing variable characteristics representing the information in the spiral track on an annular medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy along a radial line extending from the center of rotation of the medium, fifth means responsive to variations in the radial movement of the medium for producing a control signal having characteristics representing such variations in the radial movement, and sixth means operatively coupled to the second means and responsive to the control signal produced by the fifth means for varying the position of the beam along the radial line in accordance with variations in the characteristics of the control signals to compensate for variations in the radial movement of the medium.

12. The combination set forth in claim 11 wherein the sixth means provide a fine control over the recording of the information in a spiral track on the medium and wherein means are included for varying the operation of the fourth means in accordance with the variations in the characteristics of the control signals to provide a coarse control over the recording of the information in the spiral track on the medium.

13. In combination in a system for recording visual information on a medium in a spiral track on the medium to produce variable characteristics representing the information in the spiral track on a rotating annular medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means for providing a movement of the medium relative to the beam of energy along a line having a radial component extending from the center of rotation of the medium to produce a spiral track of information on the medium, fifth means responsive to variations in the movement of the medium along the line having the radial component for producing a control signal having characteristics representing such variations in the movement, sixth means operatively coupled to the fourth means and responsive to an average value of the control signal for controlling the operation of the fourth means in accordance with the average value of the control signal to produce a coarse control of the movement of the medium along the line having the radial component, and seventh means operatively coupled to the second means and responsive to an instantaneous value of the control signal for varying the disposition of the beam relative to the medium along the line having a radial component to produce a fine control of the movement of the medium along the line having the radial component.

14. In combination in a system for recording visual information on a medium in a spiral track on the medium to produce variable characteristics representing the information in the spiral track on the medium wherein the variable characteristics on the medium are produced by the direction of energy toward the medium and wherein the medium is provided with characteristics to record the variable characteristics on the medium in accordance with variations in the characteristics of the energy directed toward the medium, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means responsive to the position of the medium along a line having a radial component extending from the center of rotation of the medium for producing a reference signal in accordance with the position of the medium, and fifth means responsive to the reference signal for providing a movement of the medium relative to the beam of energy along the line having the radial component in accordance with the characteristics of the reference signal to produce a spiral track of information on the medium.

15. The combination set forth in claim 14 wherein the fifth means includes means for driving the medium in a radial direction relative to the second means and further includes means for adjusting the speed of the driving means in accordance with the characteristics of the reference signal to provide a coarse control and further includes means for adjusting the direction of the beam in the radial direction in accordance with the characteristics of the reference signal to provide a fine control.

16. In combination in a system for recording visual information on a medium in a spiral track on the medium to produce variable characteristics representing the information on the medium in a spiral track wherein the variable characteristics are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, a reference member disposed relative to the medium to provide a comparison of the relative positions of the medium and the reference member to produce a driving signal in accordance with the relative positions of the medium and the reference member, second means disposed relative to the medium for directing a beam of energy toward the medium to produce variations in the charactertistics of the medium in accordance with variations in the characteristics of the beam, third means operatively coupled to the second means for obtaining variations in the characteristics of the beam in accordance with the information to be recorded on the medium, and fourth means responsive to the driving signal for providing a movement of the medium relative to the beam of energy in accordance with the characteristics of the driving signal and for providing such a movement along a line having a radial component extending from the center of rotation of the medium to produce a spiral track of variable characteristics on the medium.

17. In combination in a system for recording visual information on a medium in a spiral track on the medium to produce variable characteristics representing the information on the medium in a spiral track wherein the variable characteristics are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, a first member having a spiral track recorded on the member and operatively coupled to the first means to receive the same rotational movement as the medium, a stationary member having recorded on the stationary member a radial portion of the same spiral track as the first member and disposed relative to the first member to provide a comparison of the relative positions of the spiral tracks on the first and stationary members, second means operatively coupled to the first and second members for producing a control signal in accordance with the relative positions of the spiral tracks on the first and second members, third means disposed relative to the medium for directing a beam of energy toward the medium to produce variations in the characteristics of the medium in accordance with variations in the characteristics of the beam, fourth means operatively coupled to the third means for obtaining variations in the characteristics of the beam in accordance with the information to be recorded on the medium, and fifth means operatively coupled to the second means and responsive to the control signal from the second means for providing a movement of the medium relative to the beam of energy in a direction having a radial component in accordance with the characteristics of the control signal and for providing such a movement in the direction having the radial component to produce a spiral track of variable characteristics on the medium.

18. In combination in a system for recording visual information on a medium in a spiral track on the medium to produce variable characteristics representing the information on the medium in the spiral track wherein the variable characteristics are produced by the direction of information toward the medium and wherein the medium is provided with characteristics to record the variable characteristics on the medium in accordance with variations in the characteristics of the energy directed toward the medium, first means operatively coupled to the medium for providing a rotational movement of the medium, a first member having a spiral track recorded on the member and operatively coupled to the first means to receive the same rotational movement as the medium, a stationary member having recorded on the stationary member a radial portion of the same spiral track as the first member and disposed relative to the first member to provide a comparison of the relative positions of the spiral tracks on the first and stationary members, second means operatively coupled to the first and second members for producing a control signal in accordance with the relative positions of the spiral tracks on the first and second members, third means disposed relative to the medium for directing a beam of energy toward the medium to produce variations in the characteristics of the medium in accordance with variations in the characteristics of the beam, fourth means operatively coupled to the third means for obtaining variations in the characteristics of the beam in accordance with the information to be recorded on the medium, and fifth means operatively coupled to the second means and responsive to the control signal from the second means for varying the disposition of the beam relative to the medium in a direction having a radial component in accordance with the characteristics of the control signal and for providing such a disposition of the beam in the direction having the radial component to produce a spiral track of variable characteristics on the medium.

References Cited

UNITED STATES PATENTS

| | | | |
|---|---|---|---|
| 881,664 | 3/1908 | Clay | 179—100.3 |
| 2,462,263 | 2/1949 | Haynes | 179—100.3 |
| 2,927,959 | 3/1960 | Mast | 178—7.5 |
| 2,121,211 | 6/1938 | Pavda | 318—20.155 |
| 2,838,683 | 6/1958 | Munro | 318—31.1 |
| 2,985,866 | 5/1961 | Norton | 340—173 |
| 3,138,669 | 6/1964 | Rabinow | 179—100.4 |

TERRELL W. FEARS, *Primary Examiner.*

J. P. SCHERLACHER, G. LIEBERSTEIN,

*Assistant Examiners.*